United States Patent

Yamaoka et al.

[11] Patent Number: 5,484,619
[45] Date of Patent: Jan. 16, 1996

[54] METHOD FOR CURING FISH AND MEAT BY EXTRA-LOW TEMPERATURE SMOKING

[76] Inventors: Kanemitsu Yamaoka, 108, Hirabari 4-chome, Tenpaku-ku, Nagoya-shi, Aichi; Tetsuo Adachi, 38-32, Hayamiya 3-chome, Nerima-ku, Tokyo; Shizuyuki Ohta, 21-8, Ikuta 8-chome, Tama-ku, Kawasaki-shi, Kanagawa, all of Japan

[21] Appl. No.: 216,306

[22] Filed: Mar. 23, 1994

[30] Foreign Application Priority Data

Apr. 6, 1993 [JP] Japan .................................. 5-103502

[51] Int. Cl.⁶ ........................... A23B 4/044; A23L 1/31; A23L 1/35
[52] U.S. Cl. ..................... 426/315; 426/641; 426/643
[58] Field of Search ................... 426/315, 641, 426/643

[56] References Cited

U.S. PATENT DOCUMENTS 4,522,835 6/1985 Woodruff et al. ............... 426/315 X

FOREIGN PATENT DOCUMENTS

| | | | |
|---|---|---|---|
| 4104953 | 5/1992 | Germany | 426/315 |
| 59-224648 | 12/1984 | Japan | 426/315 |
| 62-111630 | 5/1987 | Japan | 426/315 |
| 63-214138 | 9/1988 | Japan | 426/315 |

*Primary Examiner*—Arthur L. Corbin
*Attorney, Agent, or Firm*—Oblon, Spivak, McClelland, Maier & Neustadt

[57] ABSTRACT

Raw fish and meat are smoked to sterilize and prevent decomposition and discoloration without losing their freshness. The smoked fish and meat pick up agreeable taste and flavor, and remain as wholesome as fresh ones when kept at easily obtainable cold-storage or freezing temperatures, even during long transportation. The smoke generated by burning a smoking material at 250° to 400° C. is passed through a filter 22 to remove tar. The smoke retaining ingredients, exerting highly preservative and sterilizing actions passed through the filter 22, are cooled to between 0° and 5° C. in a cooling unit 3. Fish or meat is processed by exposure to the smoke at the extra-low temperature thus obtained.

2 Claims, 3 Drawing Sheets 5,484,619

METHOD FOR CURING FISH AND MEAT BY EXTRA-LOW TEMPERATURE SMOKING

FIELD OF THE INVENTION

This invention relates to a method and apparatus for preserving fish and meat in a near-fresh condition by applying an extra-low temperature smoking that is sterilizing and decomposition- and discoloration-preventing while imparting agreeable taste and smell thereto.

DESCRIPTION OF THE PRIOR ART

Raw meat of tuna and other fish becomes oxidized in a very short time, with attendant blackening and deterioration. This oxidation proceeds even in the meat frozen at approximately −20° C., the temperature used in ordinary freezing. Therefore, such fish is usually frozen, and kept, at −60° C. This is the reason why the transportation and preservation of fish caught in deep-sea areas and territorial waters of foreign countries are very costly. The use of air freight, in preference to transport on ships during which stable temperature control is difficult, further adds to the transportation cost of such fish. The problem just described applies to the preservation of not only fish but also meat. It has been desired to establish some inexpensive method to transport and preserve meat without diminishing or spoiling flavor in a condition similar to that attained by ordinary freezing or cold-storage.

SUMMARY OF THE INVENTION

An object of this invention is to preserve fish and meat as fresh as possible by applying smoking that has sterilizing and decomposition- and discoloration-preventing effects.

Another object of this invention is to keep the quality of fresh fish and meat during ordinary commercial transportation by keeping them at relatively easily obtainable temperatures for ordinary cold-storage or freezing.

Still another object of this invention is to keep fish and meat fresh and impart agreeable taste and smell thereto by applying smoking.

In order to achieve the above objects, a method to cure fish or meat according to this invention comprises the steps of burning a suitable smoking material at 250° to 400° C., filtering the resulting smoke to remove mainly tar therefrom, cooling the residual smoke still retaining ingredients exerting highly preservative and sterilizing actions by passing through a cooling device, and smoking the fish or meat by exposure to the smoke cooled to between 0° and 5° C.

The fish or meat subjected to the extra-low temperature smoking described above may be immersed in salt water beforehand, followed by desalting in cold water and dewatering.

An apparatus to achieve the objects of this invention described before comprises a smoke-generating chamber equipped with a heater to burn a smoking material, the heater having capabilities to control the temperature of the smoke and the amount of air for smoking by adjusting the opening of the air port, a smoke-filtering unit having a filter to remove mainly tar from the smoke introduced from the smoke-generating chamber and pass the smoke still retaining ingredients exerting highly preservative and sterilizing actions, a smoke-cooling unit having a cooling pipe to cool the smoke from the smoke-filtering unit to between 0° and 5° C., and a smoking chamber where pieces of fish or other meat are placed one next to another and exposed to the smoke from the smoke-cooling unit.

The method and apparatus for curing fish and meat by extra-low temperature smoking of this invention keep the quality of substantially fresh fish and meat intact during transportation and storage at relatively easily obtainable temperatures for ordinary cold-storage or freezing by taking advantage of the sterilizing and decomposition- and discoloration-preventing effects of smoking applied thereto. At the same time, they impart agreeable taste and smell without loosing the freshness of fish and meat.

More detailed features of the method and apparatus of this invention will be discussed below.

In addition to the general features described above, the method and apparatus of this invention effectively prevent the discoloration of meat and tuna and other fish having reddish meat resulting from oxidation during transportation and storage at temperatures easily obtainable in ordinary cold-storage or freezing facilities.

Besides, the method and apparatus of this invention markedly improve the disagreeable smell of, and impart agreeable taste to, tilapia and other freshwater fish having peculiar fishy odors but lacking flavor.

The smoking according to this invention is applied at characteristically low temperatures. Conventional smoking has been carried out in three temperature zones; low-temperature smoking between 20° and 40° C., medium-temperature smoking between 40° and 80° C., and high-temperature smoking above 80° C.

By contrast, the smoking according to this invention is carried out at extra-low temperatures between 0° and 5° C. The name "extra-low temperature smoking" stems from this feature.

First, woods suited for smoking are burned in the smoking chamber to produce smoke of the desired composition at 250° to 400° C. The smoke-generating chamber has a combustion table fitted with a thermostat-controlled heater to produce the desired smoke in the bottom thereof and an air port whose opening is adjusted to control the supply of air for combustion. The control of the heater and air port permits smoking at a desired temperature.

As described above, the smoking material burned at temperatures between 250° to 400° C. produces smoke. It is known that the composition of smoke varies with the temperature at which the smoking material is burned. FIG. 2 shows, for example, changes in the composition and volume of gases generated resulting from the thermal decomposition of hemicellulose, Cross and Bevan cellulose and hydrochloric acid lignin, which are the three major components of woods, and popular at A to D.

In the thermal decomposing process of woods, hemicellulose, Cross and Bevan cellulose and hydrochloric acid lignin are most vigorously decomposed at temperatures between 180° and 300° C., 240° and 400° C., and 280° and 550° C., respectively, thus producing much smoke effective for sterilization and prevention of decomposition and discoloration. The selection of temperatures between 250° and 400° C. as the range to produce smoke of the composition desirable for the purpose of this invention is based on the experience of the inventors and the analysis of experimental data. When smoking is effected at temperatures between 0° and 5° C. using the smoke generated between 250° and 400° C., maximum sterilizing and decomposition- and discoloration-preventing effects are obtainable.

It is known that formation of carcinogenic phenolic compounds and polycyclic aromatic hydrocarbons, such as 3,4-benzopyrene, can be prevented by applying thermal decomposition at 425° C. or under. Therefore, the temperature range of 250° to 400° C. is beneficial also for preventing the formation of such cancer-causing substances.

To realize smoking in this temperature range, the smoking material is burned in the smoke-generating chamber that is substantially hermetically sealed by closing the air port, with the composition of the generated smoke adjusted by the adjusting the temperature of the heater.

Many kinds of woods used for common smoking, such as oak, Japanese oak, beech, cherry, alder, Japanese linden, walnut, chestnut, white birch, hickory, poplar and plane, can be used as the smoking materials for the method and apparatus of this invention.

The smoke produced in the smoke-generating chamber is then introduced into the smoke-filtering unit that removes mainly unwanted tar but passes the smoke with ingredients exerting highly preservative, sterilizing and color-keeping actions. Various types of filters catching relatively larger particles consisting mainly of tar can be used singly or by combining filters of different mesh sizes.

With a major part of tar thus filtered off, the remaining smoke exerts preservative, sterilizing and color-keeping actions on substantially fresh fish and meat without imparting any disagreeable odor, taste or color thereto. Instead, the smoke imparts agreeable taste and smell to the processed fish and meat while keeping them in a substantially fresh condition. For instance, the meat of tuna smoked by the method of this invention remains as fresh as the raw one. The smoke imparts agreeable taste and smell while exerting preservative, sterilizing and discoloration-preventing actions. The filtering process also removes the abundant cancer-causing substances in tar.

The subsequent smoke-cooling unit cools the filtered smoke containing ingredients exerting highly preservative, sterilizing and color-keeping actions. Then, the smoke exposed to the fish or meat to be cured becomes as cold as between 0° and 5° C., preferably between 1° and 3° C. The smoke introduced from the smoke-cooling unit is brought into contact with pieces of fish or meat properly arranged in the smoking chamber similar to the conventional ones. The effects of the smoke decrease if its temperature is lower than the specified range. If the smoke temperature is higher than the specified range, the risk of damaging the freshness of fish or meat increases.

Tuna is properly sterilized, with decomposition and discoloration prevented, by applying the smoking of this invention for about 8 hours when it is cut into thin, bitesize slices and about 24 hours when it is cut into larger slices approximately 3 cm thick.

Because the smoking according to this invention is carried out at extremely low temperatures between 0° and 5° C., the smoked products maintain adequate freshness without losing their quality.

The raw fish or meat to be smoked may be immersed in salt water beforehand. Application of the extra-low temperature smoking after desalting in cold water and subsequent dewatering improves the taste and smell. The improving effect is particularly great on tilapia and other freshwater fish having peculiar fishy odors but lacking flavor.

DESCRIPTION OF THE PREFERRED EMBODIMENTS

An extra-low temperature smoking method and apparatus according to this invention are described below.

Figure 1:
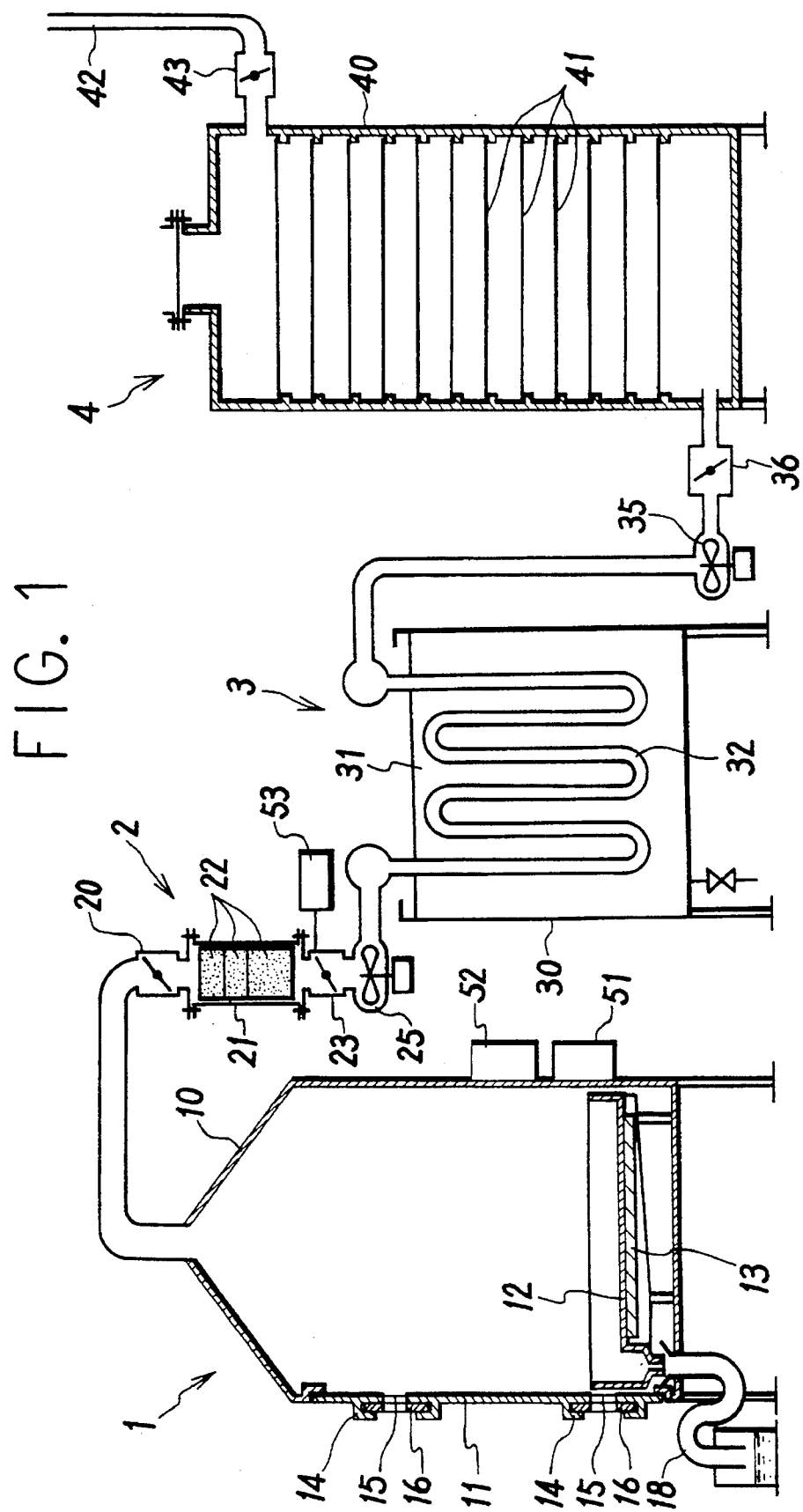
FIG. 1 shows the construction of a smoking apparatus according to this invention.
Figure 2A:
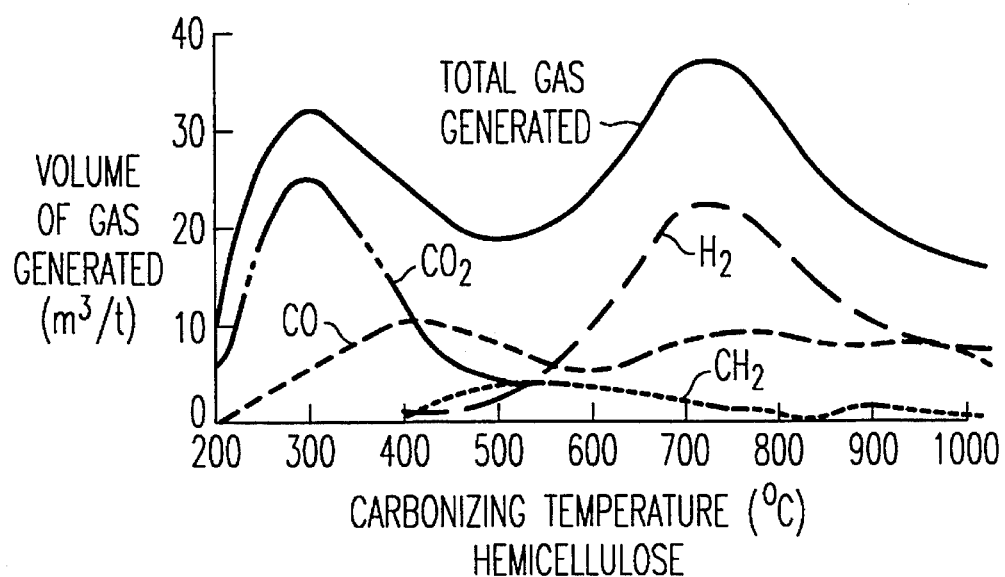
FIGS. 2A to 2D are graphs showing the temperature characteristics of the products of thermal decomposition obtained by smoking.
Figure 2B:
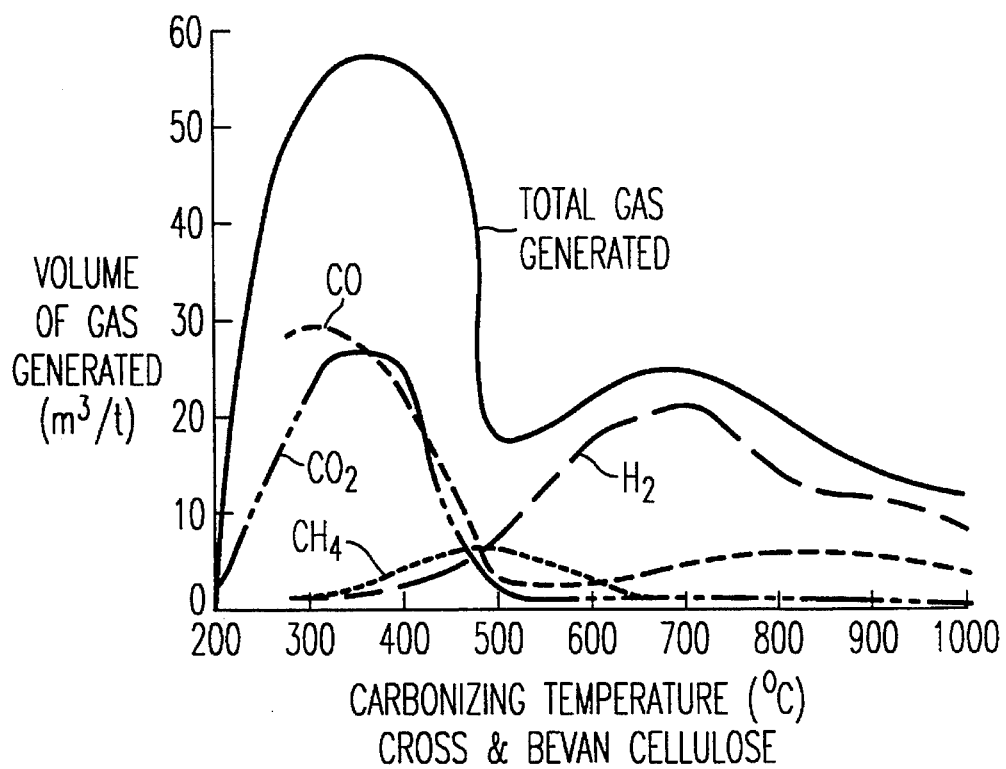
Figure 2C:
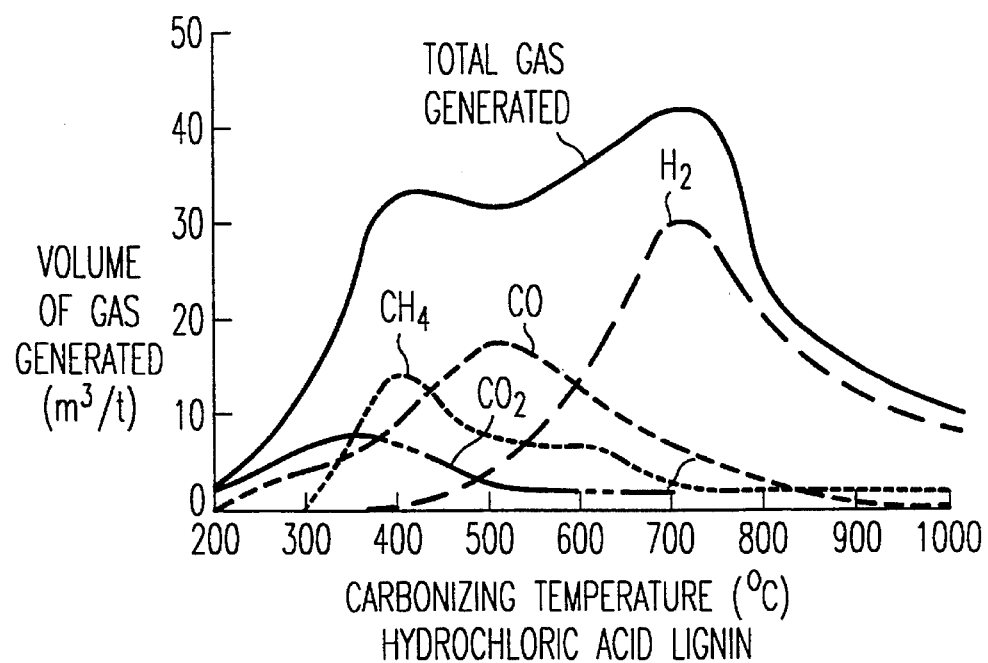
Figure 2D:
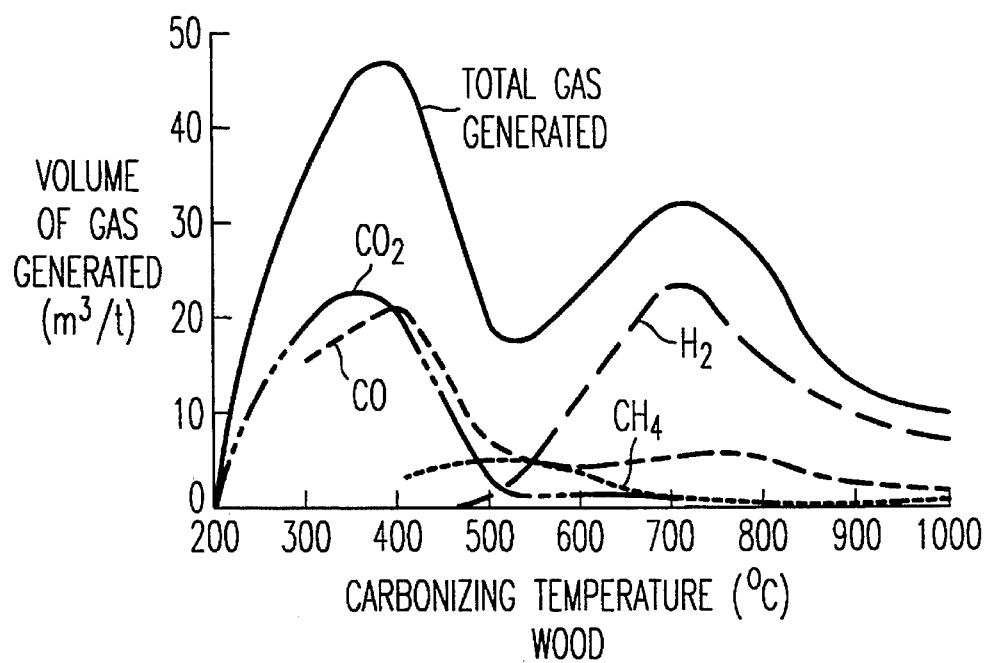

A smoking apparatus of this invention having a construction shown in FIG. 1 is obtainable by adding smoke-filtering and -cooling units to a conventional smoking apparatus.

More specifically, the illustrated smoking apparatus comprises a smoke-generating chamber 1 to burn the smoking material, a smoke-filtering unit 2 to filter the smoke produced in the smoke-generating chamber 1, a smoke-cooling unit 3 to cool the smoke from the filtering unit 2 to between 0° and 5° C., and a smoking chamber 4 in which pieces of raw fish or meat properly arranged are exposed to the smoke introduced from the smoke-cooling unit, plus, a sensor, control and other devices that may be added as required.

The smoke-generating chamber 1 is 80 cm high, 70 cm wide and 70 cm deep, with the main body 10 thereof, except a steel door 11 at the front, made of refractory bricks. A combustion table 12 having a thermostat-controlled heater 13 to burn the smoking material is placed in the bottom thereof. The heater 13 controls the production of smoke by measuring the combustion temperature.

Air controls 14 are provided above and below the door 11. Each air control 14 has multiple air ports 15 and a slidable control plate 16 to control the opening thereof. These controls regulate the amount of air supply for combustion so that the smoking material is burnt at the desired temperature with a small amount of air, whereas the heater 13 sets the temperature necessary for the production of smoke having the desired composition. Reference numeral 18 in the figure designates a smoking liquid sampler.

The smoke-generating chamber 1 is connected to the smoke-filtering unit 2 through a valve 20 provided in the flue thereof. The smoke-filtering unit 2 removes mainly tar, and passes the smoke retaining ingredients exerting highly preservative and sterilizing actions. The smoke-filtering unit 2 is an integrated assembly of a cylinder 21 of a given length and a required number of filters 22 placed one upon another. The exit end of the smoke-filtering unit 2 connects to a pipe leading to the smoke-cooling unit 3 through a valve 23. Connection at both ends of the smoke-filtering unit 2 is achieved by securing the flanges thereat to their counterparts on the mating pipes with bolts.

The filters 22 assembled in the cylinder 21 fitted in the piping to make up the smoke-filtering unit 2 are integrally changeable. Filter changing can be effected in a short time by temporarily closing the valves 20 and 23 on the side of the smoke-generating chamber 1 and the smoke-cooling unit 3, respectively.

The kind of the filters 22 optimum for each individual fish or meat to be processed must be found by experience. Choice and changing of filters can be effected easily. For example, a suitable number of different kinds of filters or different numbers of filters of the same kind may be selected and changed easily.

To the smoke-filtering unit 2 is connected a fan unit 25 that sends the smoke therefrom to the smoke-cooling unit 3 through the valve 23. The operation and control of the fan unit 25 will be described later.

The smoke-cooling unit 3 has a meandering cooling pipe 32 that is placed in a cooling tank 30 filled with a cooling liquid 31 and connected to the exit end of the fan unit 25. The smoke-cooling unit 3 delivers the smoke cooled to between 0° and 5° C. through the pipe 32 to the smoking chamber 4. Therefore, the temperature of the cooling liquid 31 is kept at least below that of the smoke sent to the smoking chamber.

The exit end of the cooling pipe 32 of the smoke-cooling unit 3 connects to a fan unit 35 that sends the smoke sucked therefrom into the smoking chamber 4 through the extension of the cooling pipe 32 via a valve 36. The operation and control of the fan unit 35 also will be described later.

Pieces of raw fish or meat properly arranged in the smoking chamber 4 are exposed to the cold smoke introduced from the smoke-cooling unit 3. The main body 40 of the smoking chamber 4, which is insulated to conserve coldness, contain many racks of wire netting 41 therein. The smoking chamber 4 connects to a flue pipe 42 to release the used smoke therefrom, with a valve 43 to control the rate of release attached to the flue pipe 42.

A temperature sensor-controller 51 is fitted to the smoke-generating chamber 1 to detect and control the temperature therein. Also, a gas detector 52 to determine the generating condition, concentration and composition of smoke is provided. The opening of the air ports 15 of the air controls 14 and the amount of smoke delivered by the fan unit 25 are interlockingly adjusted according to the concentration and composition of smoke determined by the gas detector 52.

Another gas detector 53 is provided at the exit end of the smoke-filtering unit 2 to determine the concentration and composition of smoke therefrom. The data obtained by the gas detector 53 is used for the adjustment of the opening of the air ports 15 of the air controls 14 and the amount of smoke delivered by the fan unit 25.

The amount of smoke led to the cooling pipe 32 is controlled by adjusting the rotating speed of the fan unit 25. This control, in conjunction with the temperature of the cooling liquid 31, adjusts the temperature of smoke delivered to the smoking chamber 4. The temperature in the smoking chamber 4 is kept within the desired limit by supplying smoke at low temperatures. A temperature sensor may be provided in the smoking chamber 4 to determine the temperature therein to permit the adjustment thereof by controlling the fan unit 35 according to the determined temperature.

Adjustment of the opening of the air ports 15 of the air controls 14 and the amount of smoke delivered by the fan units 25 and 35 according to the temperatures at different spots of the apparatus and the data obtained by the gas detectors 52 and 53 can be effected either automatically or manually.

An example of the smoking method according to this invention is described below.

Slices of tuna (hereinafter referred to simply as "the slices"), 16 cm long by 7 cm wide by 2 cm thick, for smoking were prepared by cutting off the head, tail and a portion near the gills and removing the backbone and blood-stained flesh from a tuna fresh from the fishery.

The slices were immersed in a 20% salt water containing small quantities of a smoke liquid and potassium nitrate for approximately 20 minutes. The slices were then desalted by exposure to cold running water at 5° C. for approximately 30 minutes, with the water collected thereon thoroughly removed with the use of dewatering paper.

This salting is beneficial to the improvement of the taste of not only tuna but also such tasteless fish as tilapia.

The slices were then smoked in an apparatus substantially identical with the one shown in FIG. 1. The slices were placed on the dewatering paper laid over the wire netting racks in the smoking chamber 4 so that no marks of the wire netting should be printed thereon.

Charcoal and a proper quantity of smoking material were placed on the heater 13 in the smoke-generating chamber 1 and burned at 360° C., with the air controls 14 completely closed at the start of operation. Then the fan unit 25 was actuated to send the smoke that has filled the smoke-generating chamber 1 through the smoke-filtering unit 2 to the cooling pipe 32 of the smoke-cooling unit 3 where the smoke was cooled to the predetermined temperature.

The generating condition, concentration and composition of smoke in the smoke-generating chamber 1 and at the exit end of the smoke-filtering unit 2 were determined with the gas detectors 52 and 53. Based on the obtained data, the air controls 14 were adjusted to ensure the desired smoke generation. When incomplete combustion was found, the fan unit 25 was adjusted depending on the amount and quality of the generated smoke.

While the cooling liquid 31 in the smoke-cooling unit 3 was invariably kept at approximately −1° C., the smoke at 0° to 3° C. from the smoke-cooling unit 3 was passed through the fan unit 35 to the smoking chamber 4 and, then, released into the atmosphere through the flue pipe 42. The temperature in the smoking chamber 4 was invariably kept at 3° C. or below (between −1° and 3° C.).

After passing smoke for approximately 4 hours, the valve 43 on the flue pipe 42 was closed. Then, the fan unit 35 was actuated to raise the pressure in the smoking chamber 4 to some extent to increase the processing speed. With the valve 36 between the fan unit 35 and the smoking chamber 4 closed, the temperature in the smoking chamber 4 remained at 3° C. or below for approximately 4 hours.

The smoking chamber 4 was opened to take out the slices 8 hours after starting the supply of smoke.

The slices smoked at extra-low temperatures proved to have improved taste, smell and preservability at ordinary freezing temperatures.

The following is the comments of a few people who tasted the smoked slices for trial.

Appearance: Practically the same as ordinary fresh tuna.

Color: As brightly red as fresh tuna.

Feeling of bite: Somewhat stickier than ordinary raw tuna.

Taste: Tastiness unique to smoked products.

Others: Causes little dripping and has no smell of ordinary smoked products.

Smoking should preferably be effected in the shorted possible time. It has been found that promotion of smoke penetration and reduction of smoking time can be achieved by repeatedly changing the level of pressure applied to the smoking chamber 4 filled with smoke. This necessitates the addition of a device to hermetically seal the smoking chamber 4 and permit the repeated changing of the level of pressure applied thereto.

Generally, tuna frozen at −60° C. can be preserved for approximately two years without discoloration and degeneration. However, thawed tuna will discolor in approximately one day. Even fresh tuna discolors in two to three days, and freezing at −20° C. produces no improving effect thereon.

By comparison, the slices of tuna smoked at an extra-low temperature as described above, frozen at −60° C., and stored in a freezer kept at −20° C. proved wholesome in color and taste even after approximately two months. This means that the foods smoked by the method of this invention can stand long transportation by ships equipped with ordinary freezing facilities. The unsmoked slices kept under the same condition for the purpose of comparison discolored in two to three days.

The level of aromatic smell characteristic of smoked products can be easily raised by varying the kind and quantity of the filtering materials in the smoke-filtering unit 2 and adjusting the volume of air delivered by the fan units 25 and 35 and the opening of the air controls 14. Imparting of a charcoal color unique to smoked products may be either prevented or allowed. The feeling of bite, taste, color, amount of drip and other factors can be varied to some extent by changing the processing time, temperature and concentration of smoke, kind and quantity of smoking materials, and other variables.

What is claimed is:

1. A method for curing raw tuna meat by extra-low temperature smoking comprising the steps of:

burning a smoking material at 250° to 400° C. and passing the produced smoke through a filter to remove mainly tar therefrom;

cooling the smoke passed through the filter in a cooling unit to between 0° and 5° C. while retaining ingredients exerting highly preservative and sterilizing effects; and smoking the tuna meat at extra-low temperatures by exposure to the smoke cooled to between 0° and 5° C.

2. A method for curing raw tuna by extra-low temperature smoking according to claim 1, in which raw tuna is pre-immersed in a salt water, desalted in cold water, and dewatered before being smoked at said extra-low temperatures.

* * * * *